United States Patent Office
3,033,770
Patented May 8, 1962

3,033,770
SUB-HALIDES OF BORON
Thomas Wartik, State College, Pa., and Richard M. Rosenberg, Wilmington, Del., assignors to Koppers Company, Inc., a corporation of Delaware
No Drawing. Filed Apr. 20, 1960, Ser. No. 23,376
9 Claims. (Cl. 204—164)

This invention relates to the preparation of binary boron halides characterized by at least one B—B bond. In one specific aspect, it relates to a novel electrical discharge method of preparing the useful boron sub-chlorides, boron sub-bromides and boron sub-iodides.

The known non-polymeric subhalides of boron include diboron tetrachloride, $B_2Cl_4$, diboron tetrabromide, $B_2Br_4$, diboron tetraiodide, $B_2I_4$, tetraboron tetrachloride, $B_4Cl_4$, and octaboron octachloride, $B_8Cl_8$. These compounds are, inter alia, useful intermediates in the preparation of aromatic boron compounds, e.g. phenylboron dichloride, which are capable of decreasing the sludging tendency of mineral lubricating oils and greases when used as described in U.S. Patent 2,234,581 of Raphael Rosen.

Diboron tetrachloride, which is perhaps the best known of the binary boron sub-halides made by the method of the invention, was first prepared by Stock et al., Ber, 58, 855 (1926), by the electrolysis of liquid boron trichloride using zinc electrodes. By this method there was obtained one drop of diboron tetrachloride, representing a 1% yield of 90% pure product. In 1949 Wartik et al., JACS 71, 3265 (1949), made 8 mg. per hour of diboron tetrachloride by passing boron trichloride through an alternating current glow discharge between mercury electrodes. The mercury electrode discharge method was adapted to automatic and continuous operation for limited periods of time by G. Urry et al., JACS 76, 5293 (1954). Using the Urry et al. technique it was possible to get up to one gram of diboron tetrachloride per week. Holiday et al., JACS 80, 4744 (1958) made some efforts to improve the mercury electrode discharge process, but their results were far from satisfactory.

It is apparent from the efforts of the prior workers in the art that the mercury electrode electrical discharge method does not represent a practical way of obtaining the useful boron sub-halides. Mercury electrodes are costly and the mercury vapors which are evolved during the high temperature, low pressure reaction diffuse through the apparatus and cause periodic fouling thereof, making frequent cleaning essential. Attempts to reduce the diffusion of mercury vapor by lowering the temperature of the reaction zone have been unsuccessful. Apparently, the sub-halides are formed via an intermediate vapor phase reaction between mercury and boron trichloride. As the amount of mercury vapor in the reactor is reduced by cooling the zone surrounding the mercury electrodes, there is a corresponding reduction in the reaction rate.

Quite surprisingly, we have discovered a novel electrical discharge technique using copper as a halogen scavenger and, in a preferred embodiment, as an electrode material, which is capable of providing boron sub-halides in yields which are 5–15 times greater than those obtainable using prior art methods. Our method has a further advantage in that it offers, for the first time, a reasonable and direct route to the boron sub-bromides and sub-iodides. These compounds could not be prepared directly by the known mercury electrode electrical discharge method.

It is, therefore, an object of the present invention to provide a new and more practical method for making the useful sub-halides of boron.

In accordance with the invention, boron halides characterized by at least one B—B bond are made by passing a gaseous boron halide of the formula $BX_3$, wherein X is a halogen having an atomic weight of at least 33, into a reaction zone under reduced pressure containing copper. A voltage of sufficient magnitude is applied to electrodes positioned within the zone to maintain an electrical discharge between them, thereby effecting reaction between the boron halide and the copper. The product is removed from the reaction zone and is collected in a suitable receiver.

The products of the method of the invention are boron sub-halides of the formula $B_nX_m$, wherein X is bromine, chlorine or iodine and $m$ and $n$ are integers. $n$ may vary from 2 to a very large number and the ratio of $n$ to $m$ is not less than 0.5 or more than about 5.

When boron trichloride is used as a reactant the most important products formed are diboron tetrachloride, a colorless monomeric liquid boiling at approximately 55° C.; tetraboron tetrachloride, a volatile white solid which is stable in the absence of air at 70° C. and which is more vigorously pyrophoric than diboron tetrachloride; and octaboron octachloride, a non-volatile, relatively stable red solid. Diboron tetrachloride, $B_2Cl_4$, comprises about 50–60% by weight of the product mixture, and tetraboron tetrachloride about 0.5–3% thereof. A minor portion of polymeric boron chlorides, $B_xCl_y$, wherein $x$ and $y$ are large, indeterminate numbers, is also formed.

Comparable products are made using boron tribromide and boron triiodide as reactants. The method of the invention represents the first direct preparation of measurable quantities of diboron tetrabromide, a product which has been previously obtained from the metathetical reaction of $B_2Cl_4$ and $BBr_3$.

The products are apparently formed as a result of a heterogeneous gas-solid reaction between gaseous boron trihalide and solid copper. The reaction does not proceed spontaneously, but the necessary excitation therefor is provided by striking an arc between suitable electrodes positioned within the reaction zone. Preferably, the copper used as a reactant in the process also serves as the electrode material.

Conveniently, a reactor is designed comprising a long sealed tube having terminal electrodes of a suitable metal, e.g. tungsten. Plugs or beds comprising thin strands of copper, i.e. copper wool, are placed along the tube (which may be nodular) at spaced intervals and a plug of copper wool is soldered to each of the terminal electrodes. The electrodes are sealed into the ends of the tube. The spacing of the copper beds at intervals in the tube provides a multiple discharge effect which we believe helps to increase the production rate.

The most suitable mechanical design for the reactor will be readily apparent to those skilled in the art. Since decomposition of the products tends to occur more rapidly on wall surfaces, the preferred reactor design provides a minimum of surface area for possible product decomposition. We have noted that decomposition proceeds more rapidly on freshly cleaned surfaces.

The exact reaction temperature is relatively unimportant except insofar as it affects the stability of the products. Since the decomposition of the products occurs more rapidly at the reactor wall surfaces, we have found it preferable to cool the walls of our tubular reactor by providing it with a jacket containing a suitable cooling medium such as cold water, Dry Ice in trichloroethylene, and the like. The temperature of the cooling jacket, and therefore of the reactor walls, is conveniently maintained between about —30 and 40° C., preferably at about 10° C. Since the reaction between the copper and the boron trihalide appears to be a heterogeneous gas-solid reaction, it is not, as is the homogeneous vapor phase reaction of the mercury electrode process, adversely affected by external cooling. As we have noted, in the mercury electrical discharge process the cooling of the reaction zone reduces the amount of mercury vapor available for the reaction and, therefore, the yield of product boron sub-halides is drastically reduced. Cooling of the reaction zone in the process of the invention is desirable, since it permits the use of higher discharge currents without danger of cracking the reactor walls (using glass equipment), reduces the amount of thermal decomposition of products occurring on the wall surfaces and serves to cool the copper beds, thereby reducing to some extent the temperature within the reaction zone.

The electrical discharge current is determined by the voltage applied to the electrodes and the resistance resulting from the gaseous pressure within the system and particular physical arrangement of the reactor, i.e. the electrode spacing. For any given physical arrangement the voltage applied should be of sufficient magnitude to strike an arc between the electrodes and less than that which causes considerable local overheating and, therefore, thermal decomposition of the products. We have obtained good results using 4,000–12,000 volts with a 60 cycle alternating current. Using 60,000 volts direct current, the yield of products was markedly reduced, presumably because of local overheating. The heating effect accompanying higher voltages is counteracted to some extent by lowering the temperature of the reactor walls and the copper beds by external cooling.

The reaction is conducted under reduced pressure which is conveniently measured in terms of the vapor pressure of the reactant boron trihalide. Since greater throughput can be obtained using higher (subatmospheric) pressures, it is generally preferable (on the basis of yield per unit time) to use the highest possible pressure at which electrical discharge between the electrodes can be maintained. As the pressure becomes too high, the resistance of the system is increased and it is not possible to strike an arc. Generally speaking, input or operating pressures between about 2 and 100 mm. of Hg are satisfactory. The contact time of the reactants varies with the pressure of the system. At lower pressures and greater contact times, higher yields per pass are generally obtained.

Using the method of the invention, about 5–15% conversion of the boron trihalide to sub-halides of boron is obtained. Ultimate conversion can be improved by recycling the boron trihalide. The product sub-halides are conveniently collected by condensing them in suitable receivers.

Our invention is further illustrated by the following examples.

*Example I*

A 130 cm. water-jacketed tube of 14 mm. internal diameter was fitted with seven plugs of copper wool about 8 cm. in length and spaced at intervals of 8 cm. Additional plugs of copper wool were soldered to terminal electrodes sealed into the ends of the tube. The apparatus was fitted with U-traps at the inlet and exit tubes and was then joined, in a vertical position, to the vacuum system. After the tube had been evacuated, pure trichloroborane was condensed in the inlet U-trap. Approximately 4,000 volts (60 cycle A.C.) was applied across the terminal electrodes by means of a luminous tube transformer and the trichloroborane was surrounded by a constant temperature bath maintained at −78.5° C. Cooling the exit tube U-trap to −196° C. initiated slow transfer of the gaseous trichloroborane through the discharge tube under a pressure of 4 mm. of Hg. After three hours of operation, diboron tetrachloride (vapor pressure=44 mm. at 0° C.) was separated from the unchanged trichloroborane by fractional condensation in an amount corresponding to a production of about 0.06 g. of the substance per hour. This is eight times the production rate obtained in the mercury reactor.

*Example II*

A reactor was assembled as described in Example I. An electrical discharge was maintained using 12,000 volts A.C. current. Gaseous boron trichloride, 160 ml. (liquid), was passed continuously through the reactor at 30–40 mm. of Hg input pressure for 29 hours. The run resulted in the continuous production of 0.21 g. of $B_2Cl_4$ per hour, representing a total yield of more than 6.0 g. The best mercury electrode discharge process, that of Urry et al., produced only 1 g. of $B_2Cl_4$ per week, in a "continuous," automatic reactor.

*Example III*

A tubular reactor similar to that described in Example I was loosely packed with 10 copper wool plugs about 5 centimeters long and about 5 centimeters apart. A voltage of 12,000 volts A.C. was applied to the electrodes to maintain continuous electrical discharge and boron trichloride, 150 ml. (liquid), was continuously passed through the reactor at 16–18 mm. of Hg input pressure over a two-hour period. The yield was 10 millimoles of $B_2Cl_4$ or 1.63 g. When the same tube was reused for four more passes, using a fresh $BCl_3$ for each pass, yellow and brown solids accumulated in the tube. The flow of $BCl_3$ was impeded to such an extent that the fifth pass required 8 hours. The total $B_2Cl_4$ formed in the five passes was 6.7 g.

*Example IV*

To test the effect of higher voltage, a D.C. spark coil, 60,000 volts D.C., was connected to the copper wool containing tubular reactor used in Example I. Boron trichloride, 150 ml., was passed therethrough at an input pressure varying from 2–100 mm. of Hg over a period of 1.5 hours. The nature of the discharge seemed independent of the pressure. There was obtained only 0.32 g. of $B_2Cl_4$ as a product.

*Example V*

Boron tribromide was substituted for the boron trichloride used in Example I. $B_2Br_4$, which was identified by infrared analysis, was obtained as a product.

*Example VI*

Using the conditions described in Example II, a run was made by recycling the product mixture containing unreacted $BCl_3$ through the reactor after adding thereto fresh $BCl_3$ in an amount sufficient to make up the recycle mixture to 93 g. After recycling three times (four passes in all) there was obtained an average $B_2Cl_4$ production of 0.27 g. per hour. A total of 4.1% of the $B_2Cl_3$ was converted to sub-halides and of this, 52.1% was converted to $B_2Cl_4$. The other sub-halides obtained were $B_4Cl_4$, $B_8Cl_8$, and unidentified high polymers. The first pass took 1½ hours and subsequent passes were successively slower.

*Example VII*

The conditions of Example VI were substantially repeated. A 108.9 g. quantity of $BCl_3$ was introduced into the reaction zone and a number of passes were made. After a total of four passes, 15.9 g. of $BCl_3$ was consumed, representing a 14.6% conversion of the $BCl_3$ to sub-halides of boron. The yield of $B_2Cl_4$ based on converted $BCl_3$ was 16.2% of theory.

We claim:

1. Method of making binary boron sub-halides characterized by at least one B—B bond comprising passing a gaseous boron halide of the formula $BX_3$, wherein X is a halogen atom having an atomic weight of at least 33, into a reaction zone under reduced pressure containing copper and having located therein electrodes in spaced relationship, said electrodes having a voltage applied thereto sufficient to maintain an electrical arc discharge between said electrodes, and removing the product boron sub-halides from said zone.

2. In an electrical discharge process for making binary boron sub-halides characterized by at least one B—B bond, the improvement comprising providing metallic copper in a reaction zone while passing a gaseous boron halide of the formula $BX_3$, wherein X is a halogen having an atomic weight of at least 33, through said zone, maintaining an electrical arc discharge therein, and removing a binary boron sub-halide from said zone.

3. Method of making binary boron sub-halides characterized by at least one B—B bond comprising passing a gaseous boron halide of the formula $BX_3$, wherein X is a halogen atom having an atomic weight of at least 33, into a reaction zone under reduced pressure containing copper electrodes in spaced relationship, said electrodes having a voltage applied thereto sufficient to maintain an electrical arc discharge between said electrodes, and removing the product boron sub-halides from said zone.

4. Method according to claim 3 wherein X is chlorine.
5. Method according to claim 3 wherein X is bromine.
6. Method according to claim 3 wherein X is iodine.
7. Method according to claim 3 wherein the reaction zone is under a pressure of 2-100 mm. of Hg.
8. Method according to claim 3 wherein the walls of the reaction zone are maintained at a temperature of —30 to 40° C.
9. Method of making diboron tetrachloride comprising passing gaseous $BCl_3$ into a reaction zone under a pressure of 2-100 mm. of Hg containing copper electrodes in spaced relationship, said electrodes having a voltage applied thereto sufficient to maintain an electrical arc discharge between said electrodes and the walls of said zone being maintained at a temperature of —30 to 40° C., and removing diboron tetrachloride from said zone.

References Cited in the file of this patent

UNITED STATES PATENTS

| | | |
|---|---|---|
| 1,046,043 | Weintraub | Dec. 3, 1912 |
| 2,994,652 | Frazer et al. | Aug. 1, 1961 |

OTHER REFERENCES

Ellis et al.: The Chemical Action of Ultraviolet Rays (1941), pages 63 and 64.

Wartik et al.: Journal of American Chemical Society, volume 71 (September 1949), page 3265.